United States Patent [19]
Moen et al.

[11] 3,902,876
[45] Sept. 2, 1975

[54] GAS-LIQUID VORTEX SEPARATOR

[75] Inventors: Robert H. Moen, San Jose; Siegbert Wolf, Sunnyvale, both of Calif.

[73] Assignee: General Electric Company, San Jose, Calif.

[22] Filed: May 28, 1974

[21] Appl. No.: 473,928

Related U.S. Application Data

[63] Continuation of Ser. No. 300,910, Oct. 26, 1972, abandoned, which is a continuation-in-part of Ser. No. 273,995, July 21, 1972, abandoned.

[52] U.S. Cl. ............... 55/348; 55/457; 122/34; 122/488
[51] Int. Cl. ............................................. B01d 45/12
[58] Field of Search ............ 55/457, 343, 345, 348; 122/34, 488

[56] References Cited
UNITED STATES PATENTS
3,603,062  9/1971  Robbins et al. ................... 55/457

FOREIGN PATENTS OR APPLICATIONS
514,224  10/1952  Belgium .............................. 55/345

*Primary Examiner*—Bernard Nozick
*Attorney, Agent, or Firm*—Ivor J. James, Jr.; Samuel E. Turner; Sam E. Laub

[57] ABSTRACT

A centrifugal gas-liquid separator having a single vortex generator and three serially positioned vortex tubes each having a liquid pickoff ring.

28 Claims, 8 Drawing Figures

GAS-LIQUID VORTEX SEPARATOR

CROSS-REFERENCE

This application is a continuation of application Ser. No. 300,910, filed Oct. 26, 1972 which in turn is a continuation-in-part of copending U.S. patent application Ser. No. 273,995, filed July 21, 1972 both abandoned.

BACKGROUND

Gas-liquid or steam-water separators adaptable, for example, for use in the pressure vessel of a nuclear reactor steam generator have been described by J. T. Cochran et al. in U.S. Pat. No. 3,216,182, by J. T. Cochran in U.S. Pat. No. 3,329,130 and by C. H. Robbins et al. in U.S. Pat. No. 3,603,062. In such arrangements a plurality of closely spaced separator units are mounted on a dome or cover atop a steam chamber above the nuclear reactor core.

Continued improvements in nuclear reactor steam generators have resulted in increased power output with higher mixture and steam flow rates and higher steam quality (weight percent of steam in the mixture) at the separator inlets. In the interest of minimizing the size of the costly pressure vessel, continued improvements in reducing the size and increasing the effectiveness of the separator units are desirable. Thus it is an object of the invention to provide an improved gas-liquid separator with increased capacity per unit size. It is also an object to simplify the construction and decrease the cost of gas-liquid separating units.

SUMMARY

These and other objects are achieved by providing separating units each comprising primary, secondary and tertiary vortex tubes positioned end-to-end, the primary vortex tube having an inlet end containing a vortex generator for receiving a gas-liquid mixture and for creating a gas vortex surrounded by a liquid vortex. Each vortex tube contains a coaxially disposed annular liquid pickoff ring adjacent its outlet end. Each vortex tube is surrounded by a discharge channel. The discharge channel surrounding the first vortex tube containing a discharge flow area restriction ring to control gas carryunder.

In one embodiment, the diameters of the vortex tubes and surrounding discharge channels are the same while in another embodiment the diameters are different to provide greater gas volume above the liquid pool among the separator units. In modified embodiments the secondary and tertiary vortex tubes are divergent.

DRAWING

The invention is more fully described hereinafter with reference to the accompanying drawing wherein.

Figure 1:
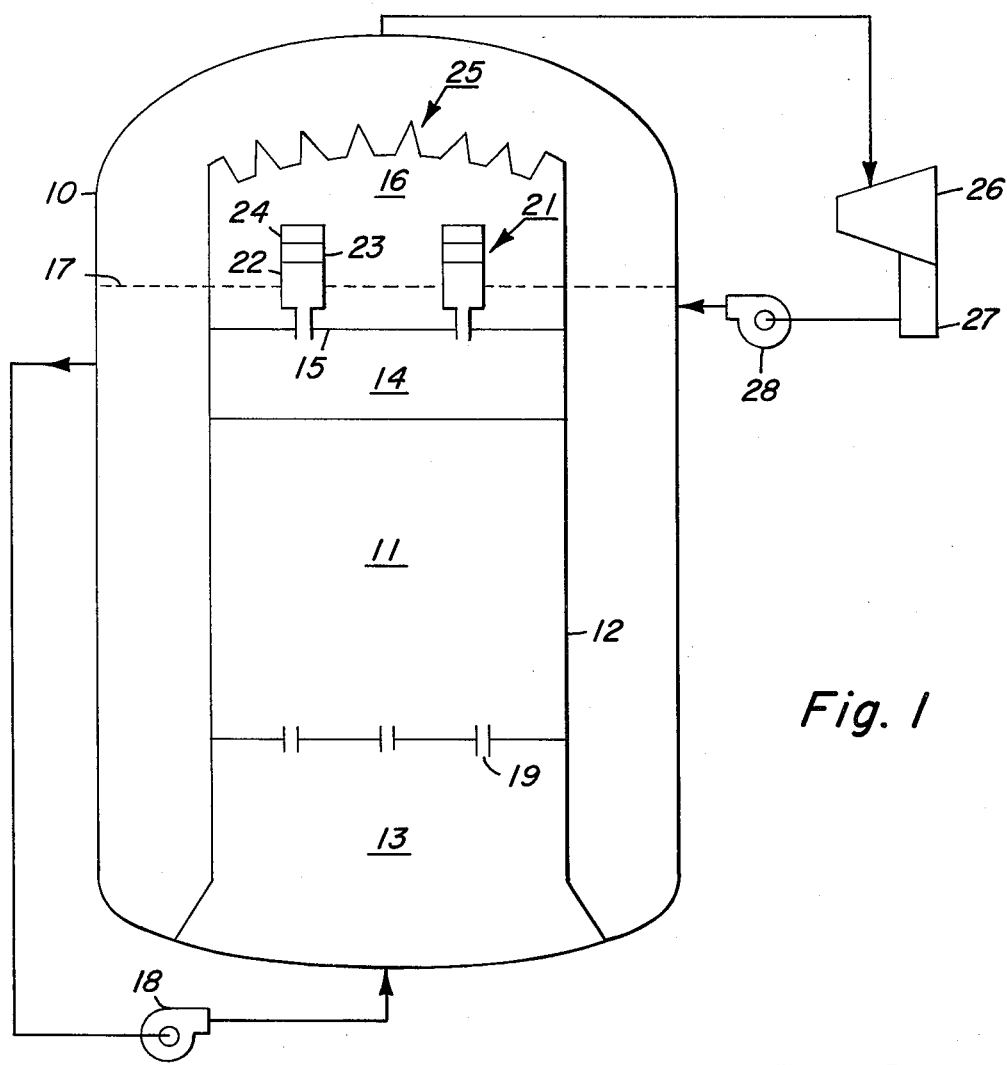
FIG. 1 is a schematic illustration of a boiling water nuclear reactor system employing the gas-liquid separating units of the invention.

Shown schematically in FIG. 1 is an example of a nuclear reactor steam generator system of the boiling water type. The reactor system includes a pressure vessel 10 containing a nuclear fuel core 11. The core 11 is surrounded by a shroud 12 which forms a water inlet plenum 13 beneath the core, a steam-water mixture chamber 14 above the core and a steam chamber 16 above the water level indicated by a dashed line 17.

Water under pressure is supplied to the inlet plenum 13 by, for example, a circulation pump 18 by which the water is forced through a plurality of orifices 19 upward past the nuclear fuel of the core 11 whereby a portion of the water is converted into steam. The resulting steam-water mixture in chamber 14 flows through a plurality of gas-liquid separating units 21 mounted on a dome or cover 15. Each of the separating units 21 comprises, in accordance with the invention, first or primary, second or secondary and third or tertiary separator portions 22, 23 and 24, respectively. These separating units 21 discharge the steam into chamber 16 and return the water to the pool of water surrounding the separator units in the pressure vessel. The steam passes from chamber 16 through a dryer arrangement 25, which extracts residual moisture, and is taken from the pressure vessel to a utilization device such as a steam turbine 26. The turbine exhaust is condensed in a condenser 27 and returned to the pressure vessel by a pump 28.

Figure 2:
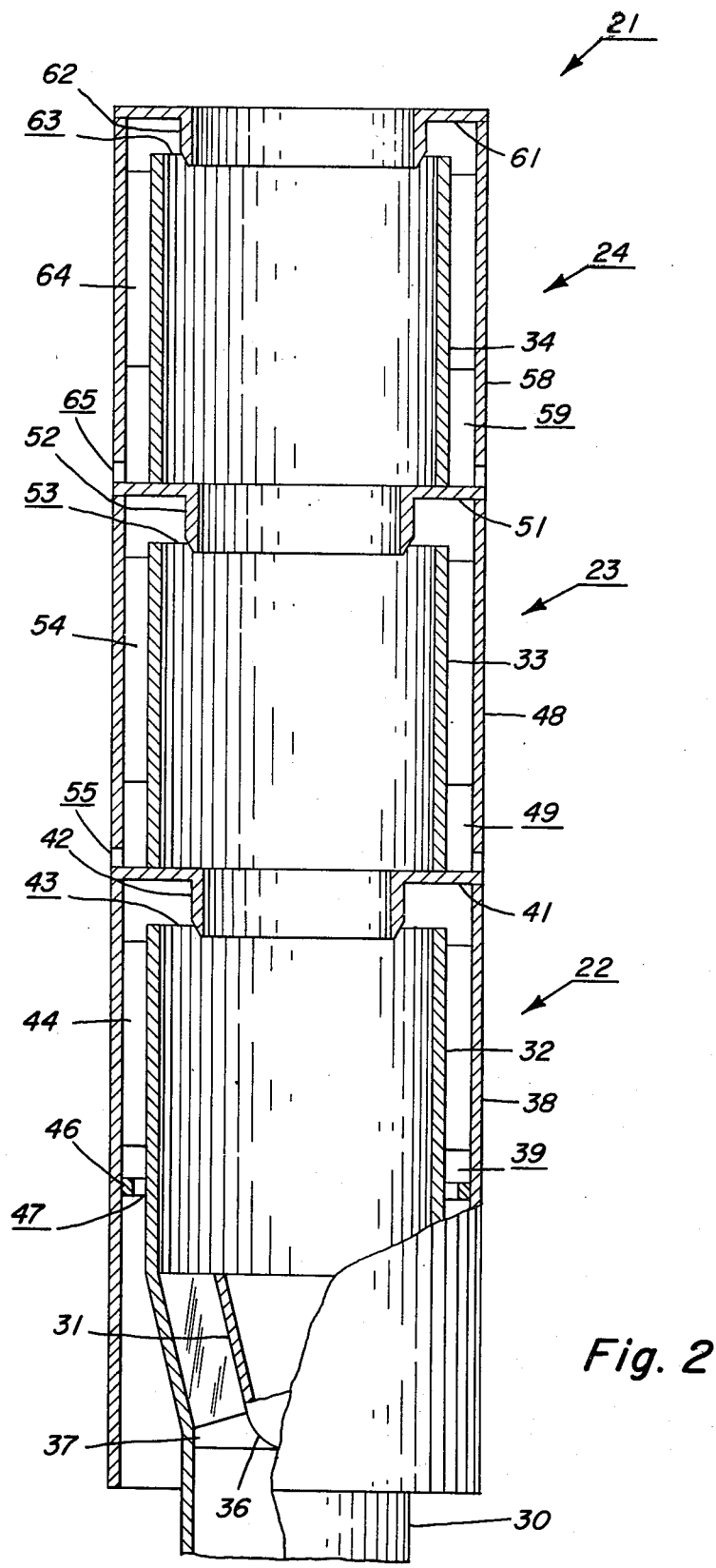
FIG. 2 is an elevation view, partly in longitudinal cross section of a first embodiment of a separator unit according to the invention.

A first embodiment of a gas-liquid separating unit 21 in accordance with the present invention is illustrated in FIG. 2, the portions 22, 23 and 24 containing vortex tubes 32, 33 and 34, respectively. The steam-water mixture (from mixture chamber 14, FIG. 1) enters a standpipe 30 and is conducted thereby to a vortex generator 31. The vortex generator 31 contains vortex generating means such as a central hub 36 surrounded by a plurality of curved vanes 37 (as shown in greater detail in the above-referenced U.S. Pat. No. 3,216,182). The vortex generator thus imparts a rotary motion to the steam--water mixture as it flows upward into the inlet end of the first or primary separator vortex tube 32. The resulting centrifugal force creates a separation of the steam and water into an inner steam vortex surrounded by a water vortex which flows upward along the inner wall of vortex tube 32.

Coaxially surrounding the primary vortex tube 32 is a first outer tube 38 forming an annular water discharge passage or channel 39 between the tubes 32 and 38. Supported atop the outer tube 38 is an apertured cover 41. The cover 41 supports a primary pickoff ring 42 in coaxially disposed relation to the outlet end of the vortex tube 32 to form an annular water pickoff passage 43.

Thus a substantial portion of the water vortex, flowing upward along the inner wall of vortex tube 32, flows through the passage 43 and is turned downward into the discharge channel 39 by the cover 41. To arrest the rotary motion of the water, a plurality of vertical baffles 44 are positioned between the tubes 32 and 38 in the discharge passage 39. (For example, the baffles 44 may be four equally spaced rectangular strips.) The discharge channel 39 is open at its bottom end to return the separated water to the water pool.

Figure 3:
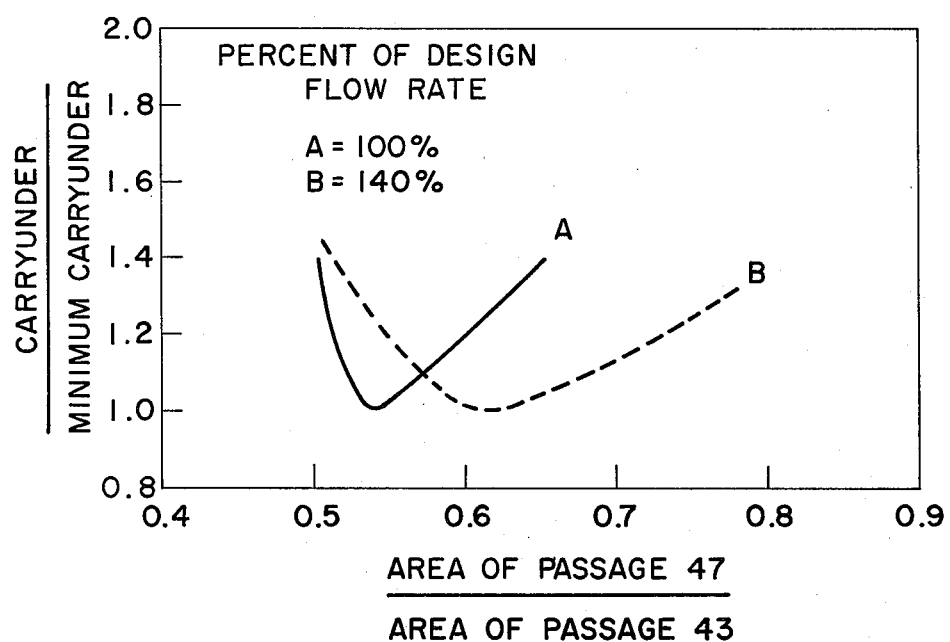
FIG. 3 illustrates the effect of the discharge channel restriction on carryunder.

Also provided in the discharge channel 39 is an annular restriction ring 46 which reduces the flow cross section area of the discharge channel to provide a restricted discharge passage 47. The restricted discharge passage 47 provides an amount of back pressure which aids in maintaining a required thickness of the water vortex for the purpose of minimizing steam carryunder (steam entrained in the water returned to the water pool). It has been discovered that for minimum carryunder the area of the discharge passage 47 should be from 40 to 80 percent of the area of the annular passage 43 between the vortex tube 32 and the pickoff ring 42. This is illustrated in FIG. 3 which shows a family of curves A and B of the ratio of carryunder to minimum carryunder versus the ratio of the area of discharge passage 47 to the area of pickoff passage 43 for mixture flow rates of about 100 percent (curve A) and 140 percent (curve B) of the design flow rate.

The steam vortex plus a residual water vortex flows upward through the opening in pickoff ring 42 into the inlet end of the secondary vortex tube 33. The vortex tube 33 is coaxially surrounded by a second outer tube 48 to form a second discharge channel 49. Atop the outer tube 48 is an apertured cover 51 which supports a secondary pickoff ring 52 coaxially disposed adjacent the outlet end of vortex tube 33 to form a secondary annular pickoff water passage 53. Thus a substantial portion of the residual water vortex, flowing upward along the inner wall of vortex tube 33, flows through passage 53 and is turned downward into the discharge channel 49 by the cover 51. A plurality of baffles 54 may be positioned in the channel 49 between the tubes 33 and 48 to arrest the rotary motion of the water. A plurality of discharge openings 55, formed in the lower end of tube 48, allow flow of the water through channel 49 to the exterior of the separating unit and thence to the surrounding water pool.

Thus the secondary portion 23 of the separator unit 21 removes additional water and the steam vortex plus the residual of the water vortex flows upward through the opening in pickoff ring 52 into the inlet end of the third or tertiary vortex tube 34. The vortex tube 34 is coaxially surrounded by a third outer tube 58 to form a third water discharge channel 59. Above the tube 58 is an apertured cover 61 depending from which is a tertiary pickoff ring 62 coaxially disposed adjacent the outlet end of vortex tube 34 to form an annular water pickoff passage 63. Thus the final portion of the water vortex, flowing upward along the inner wall of vortex tube 34, flows through the passage 63 and is turned downward into the discharge channel 59 by the cover 61. A plurality of baffles 64 may be provided to arrest the rotary motion of the water and the water is discharged to the exterior of the separating unit through a plurality of openings 65 in the lower end of outer tube 58. The steam vortex exits the separating unit 21 through the opening in pickoff ring 62 and enters the steam chamber 16 (FIG. 1).

The primary passage 43 between the vortex tube 32 and the pickoff ring 42 receives a large percentage of the water vortex as compared to the water received through secondary passage 53 and tertiary passage 63. Therefore, the flow area of passage 43 is made larger than the flow areas of passages 53 and 63. For similar reasons the flow area of secondary passage 53 may be made larger than the flow area of tertiary passage 63. In the embodiment of FIG. 2, the vortex tubes 22–24 are of the same diameter, therefore the desired difference in passage flow area may be provided by selecting pickoff rings of appropriately different inside diameters; that is, the inside diameter of primary pickoff ring 42 is less than the inside diameter of the secondary pickoff ring 52 which, in turn, may be of lesser inside diameter than the tertiary pickoff ring 62.

In an example implementation of the embodiment of the separator unit of FIG. 2 the overall height of the unit is about 90 inches, the outside diameter is about 10 inches, the inside diameter of the vortex tubes is about 8.5 inches, the inside diameters of the pickoff rings 42, 52 and 62 are about 6.75, 7.5 and 7.75 inches respectively, and the radial widths of the annular passages 43, 53 and 63 are about 0.75, 0.38 and 0.25 inches respectively.

Figure 4:
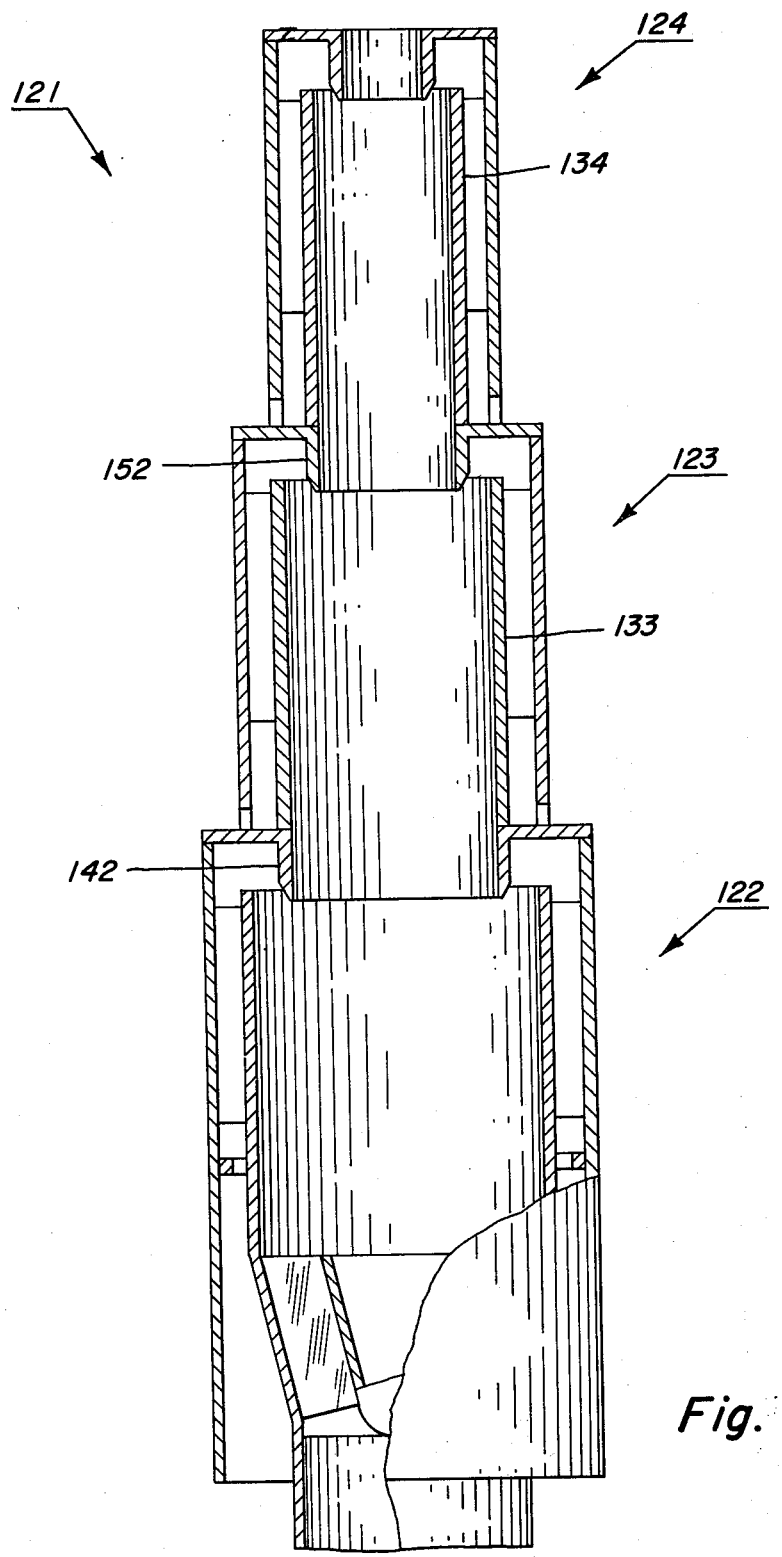
FIG. 4 is an elevation view, partly in longitudinal cross section, of a second embodiment of a separator unit.

Shown in FIG. 4 is a "stepped" embodiment of a separator unit 121 of the invention. The separator unit 121 comprises a primary portion 122, a secondary portion 123 and a tertiary portion 124. The structure of the separator unit 121 is generally similar to the unit 21 of FIG. 2 except that the components of the secondary portion 123 and tertiary portion 124 are of reduced diameters to provide the stepped configuration. As illustrated in FIG. 4 these diameter reductions are maximized; that is, the secondary vortex tube 133 is of the same inside diameter as the primary pickoff ring 142 and the tertiary vortex tube 134 is of the same inside diameter as the secondary pickoff ring 152. (Diameters intermediate those illustrated in FIGS. 2 and 4 could be used. Also a two-stepped embodiment could be formed with secondary and tertiary vortex tubes and outer tubes of the same diameter.) The advantage of the stepped embodiment is that it provides greater free area between the separator units for the same separator unit spacing on the dome 15 (FIG. 1).

Figure 5:
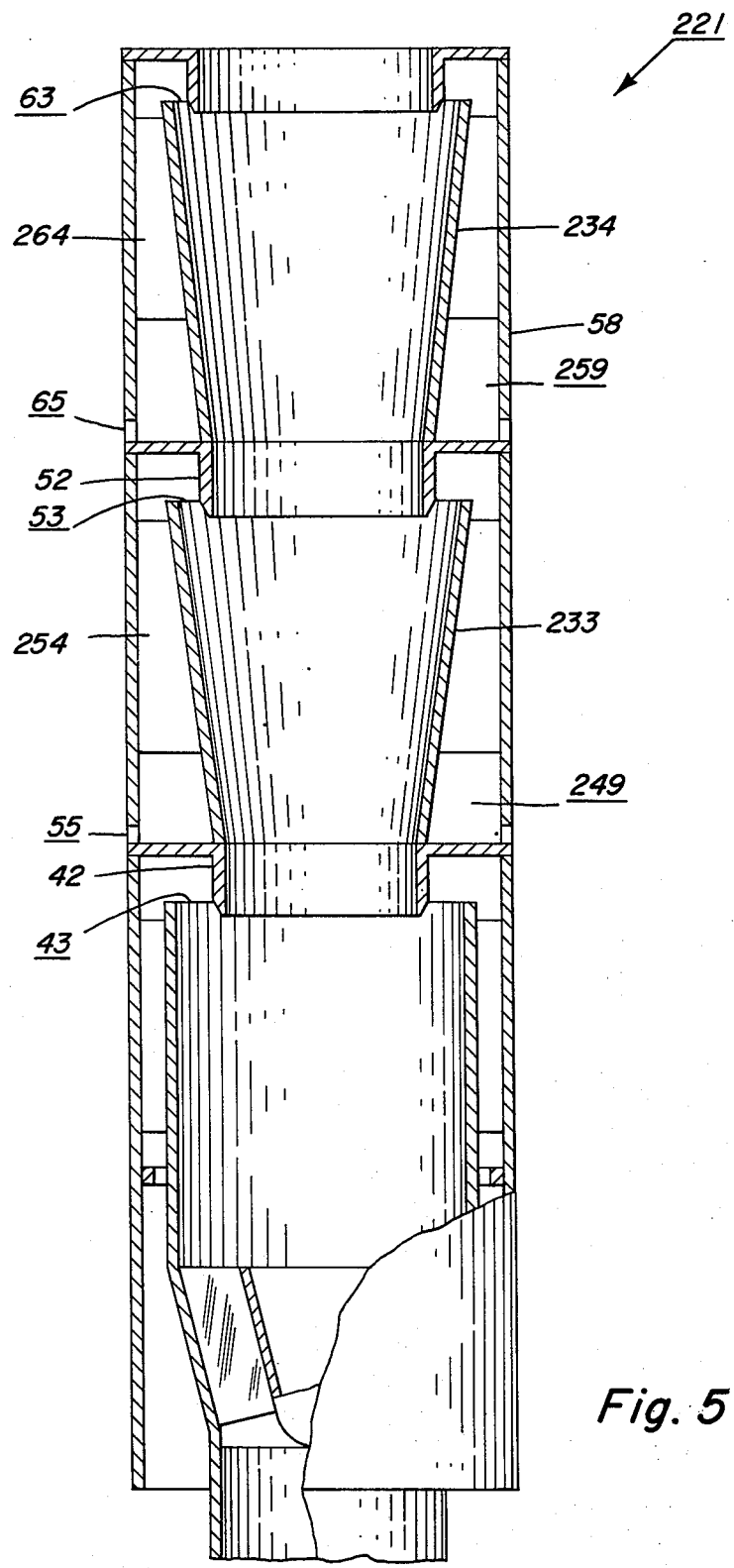
FIG. 5 illustrates a modification of the separator units of FIGS. 2 and 4.

A modification of the separator unit of the invention is shown in FIG. 5 as a separator unit 221 wherein the cylindrical secondary and tertiary vortex tubes 33 and 34 of FIG. 1 are replaced by divergent or inverted cone shaped secondary and tertiary vortex tubes 233 and 234. The inside diameters of the upper ends of the conical vortex tubes 233 and 234 are the same as the inside diameters of the cylindrical vortex tubes which they replace while at their lower ends their inside diameters are equal to the respective inside diameters of the adjacent pickoff rings 42 and 52. (The separator structure is otherwise similar to that shown in FIG. 2 with the exception of suitably tapered baffles 254 and 264.) The tapered vortex tubes eliminate the pockets above the pickoff rings 41 and 51, thereby eliminating the possibility of water being trapped therein and re-entrained therefrom. They also reduce pressure losses by preventing abrupt expansion and by decreasing the speed of flow whereby a degree of pressure recovery is achieved. The divergent vortex tubes also provide beneficial divergent form to the discharge passages 249 and 259 surrounding the vortex tubes. This modification can also be applied to the stepped separator unit of FIG. 4 in cases where the inside diameters of the secondary and tertiary pickoff rings 133 and 134 are larger in inside diameter than the respectively adjacent pickoff rings 142 and 152.

Figure 6:
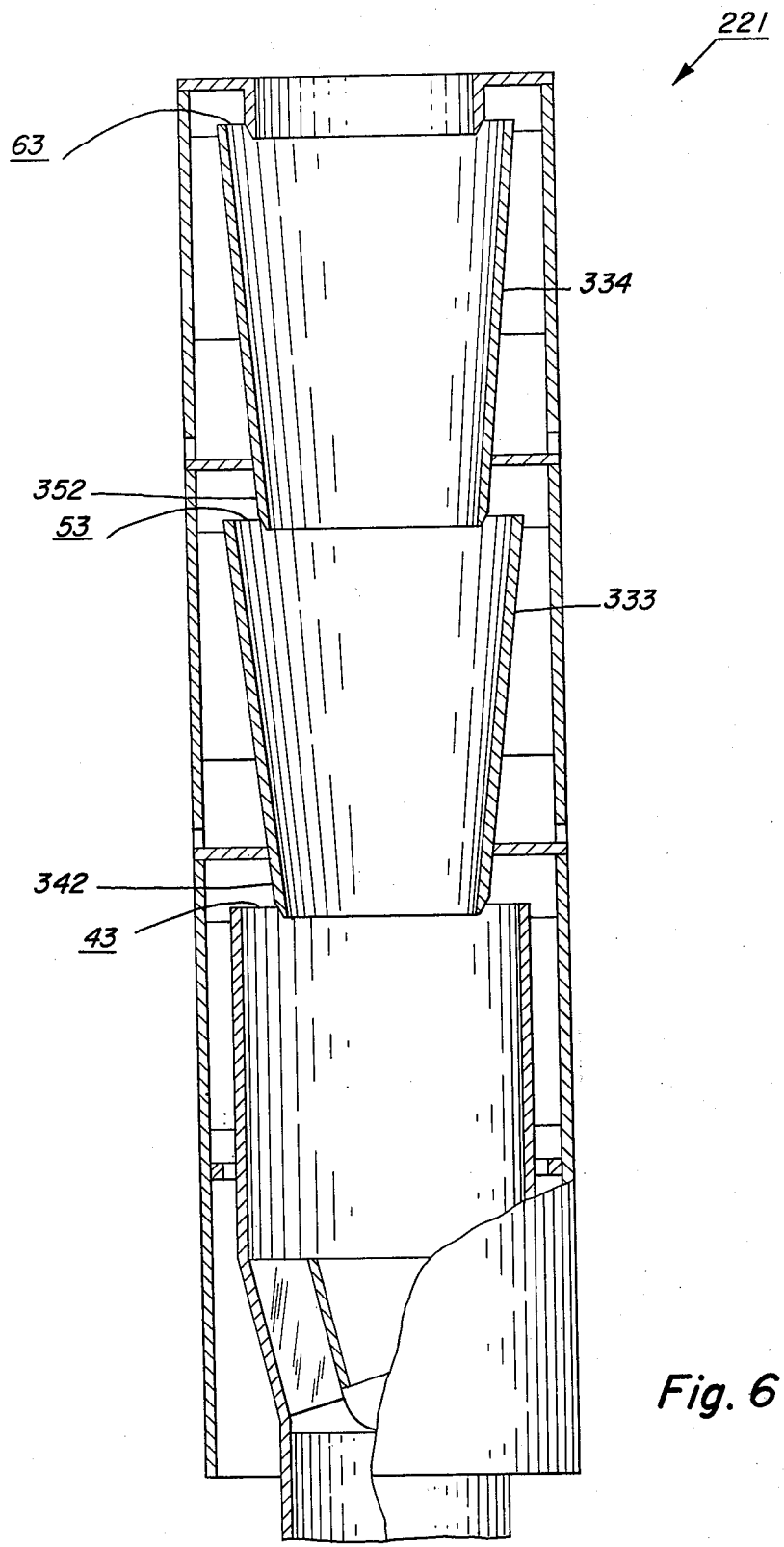
FIG. 6 illustrates a further modification of the separator unit of the invention.

A further modification to simplify construction is illustrated in FIG. 6 wherein the equivalents of primary and secondary pickoff rings 42 and 52 are formed by extended lower portions 342 and 352 of divergent secondary and tertiary vortex tubes 333 and 334.

In the separator units shown in FIGS. 5 and 6 the angles of divergence of the secondary and tertiary vortex tubes are determined by the lengths of the tubes and by the ratios of their inlet and outlet diameters. These parameters are determined by several separator design considerations including the flow requirements of the liquid vortex through the secondary and tertiary pickoff passages 53 and 63. Thus conflicting design requirements may make it difficult to optimize the angles of divergence of the secondary and tertiary vortex tubes.

Figure 7:
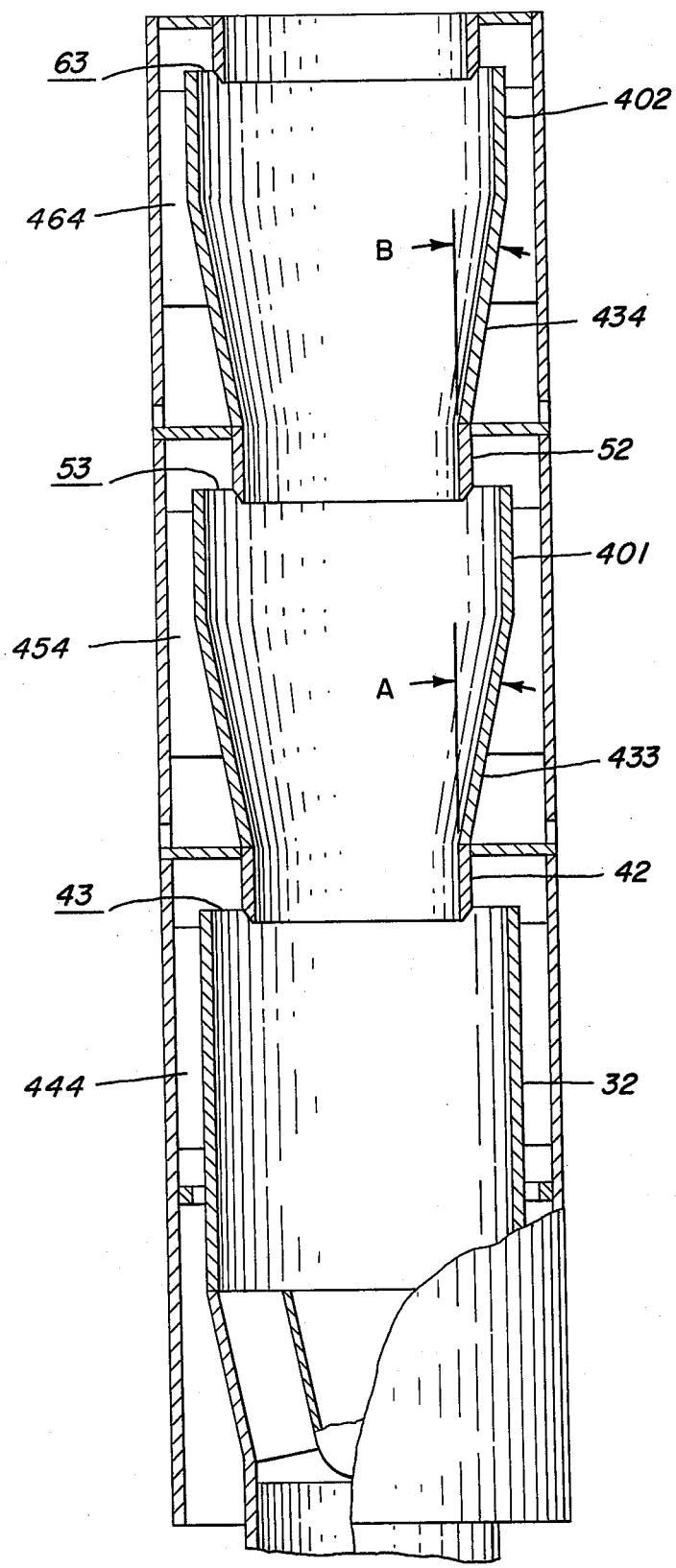
FIGS. 7 and 8 illustrate further modifications of the separator unit of the invention.
Figure 8:
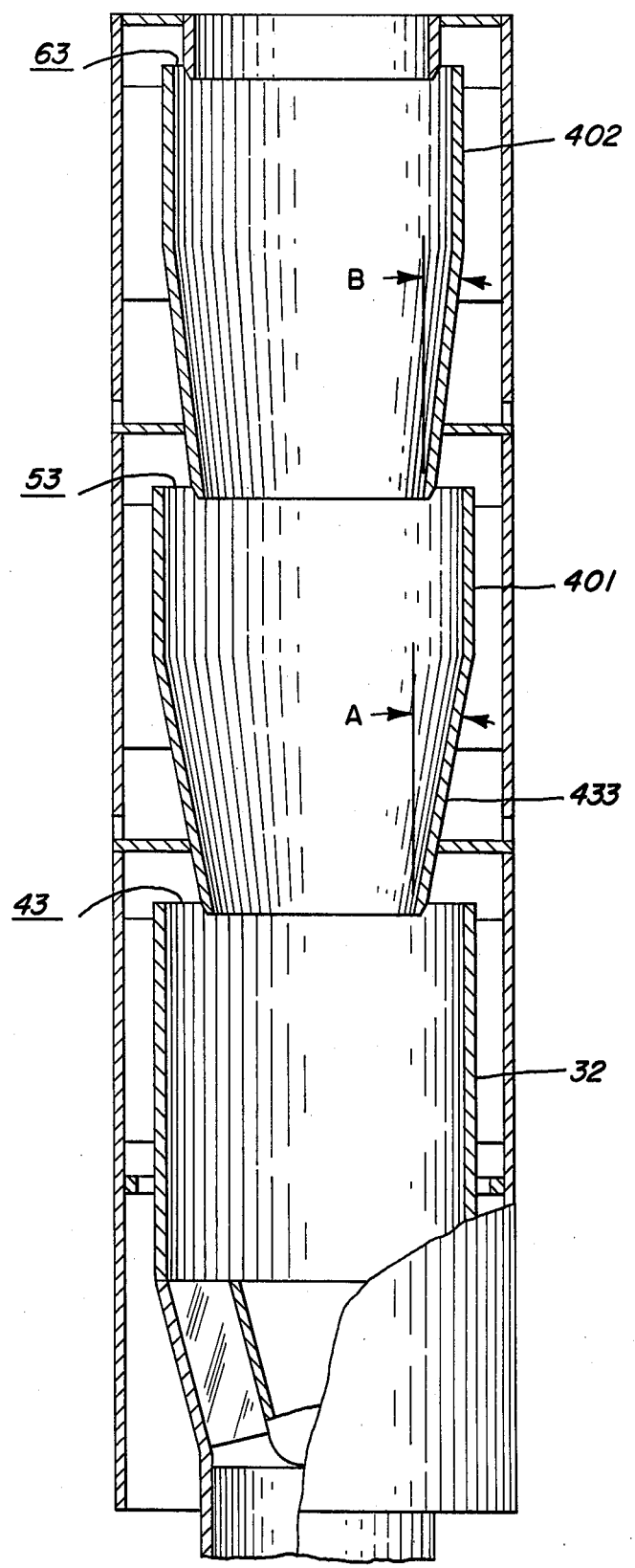

Modifications of the separator unit of the invention illustrated in FIGS. 7 and 8 provide an arrangement whereby the angles of divergence of the secondary and tertiary vortex tubes can be optimized substantially independent of other separator design parameters.

In FIG. 7 the secondary vortex tube is formed by a divergent portion 433 followed by a cylindrical portion 401. Similarly, the tertiary vortex tube is formed by a divergent portion 434 followed by a cylindrical portion 402. With this construction the relative lengths of the divergent and cylindrical portions of the vortex tubes can be selected to provide half-angles of divergence A and B which result in maximum pressure recovery and, hence, minimum pressure losses.

The optimum half-angles A and B can best be determined for a particular application by systematic experimental variation. Because of the vortex flow, the optimum half-angles of divergence are greater than is the case for uniform axial flow with no swirl or in the order of about 3°-7°. For use in the example implementation of the invention given hereinbefore, the dimensions of the secondary and tertiary vortex tubes may be as follows. For the secondary vortex tube, the axial length of the divergent portion 433 is about 10 inches, the axial length of the cylindrical portion 401 is about 4.5 inches and the half-angle of divergence A is about 5°. For the tertiary vortex tube, the axial lengths of the divergent portion 434 and the cylindrical portion 402 are both about 7.25 inches and the half-angle of divergence B is about 4°.

In FIG. 8 construction is simplified by lengthening the cylindrical portions 401 and 402 thereby placing the divergent portions 433 and 434 in a more downward position whereby the lower ends thereof form the equivalents of the pickoff rings 42 and 52.

The advantages of the separator system of the invention over the prior art arrangements may be summarized as follows: For a separator unit of given size the steam flow capacity is increased at least 30 percent for the same limits of water carryover and steam carryunder and the separator unit maintains satisfactory operation over increases in inlet quality of at least 30 percent. The reduced diameter of the separator unit allows decreased pitch (closer spacing) of the units on the steam chamber dome 15 (FIG. 1). Thus a greater number of units can be accommodated on a dome of given size with consequent reduction in overall pressure drop through the separator system. Alternatively, for a given separator unit spacing the smaller diameter provides greater free area between separator units with consequent less entrainment of water in the steam rising from the surrounding water pool. (This advantage is enhanced by stepped embodiment of FIG. 4.). Furthermore, the foregoing performance improvements are achieved by a simplified less costly structure without intricate or complicated components.

What is claimed is:

1. A gas-liquid separating unit comprising: a first elongated vortex tube having an outlet end and having an inlet end for receiving a gas-liquid mixture; a vortex generator positioned within said inlet end of said first vortex tube for establishing in said first vortex tube a gas vortex surrounded by a liquid vortex; a first pickoff ring having an inlet end and an outlet end, having an outside diameter less than the inside diameter of said outlet end of said first vortex tube, said inlet end of said first pickoff ring extending into said outlet end of said first vortex tube in coaxial relation thereto to form therebetween a first passage for receiving a substantial portion of said liquid vortex; a second elongated vortex tube having a divergent inlet portion and a cylindrical outlet portion, the inlet end of said inlet portion having an inside diameter similar to the inside diameter of said outlet end of said first pickoff ring, said inlet end of said second vortex tube abutting said outlet end of said first pickoff ring; a second pickoff ring having an inlet end and an outlet end, having an outside diameter less than the inside diameter of said outlet end of said second vortex tube, said inlet end of said second pickoff ring extending into said outlet end of said second vortex tube in coaxial relation thereto to form therebetween a second passage for receiving a portion of said liquid vortex; a third elongated vortex tube having a divergent inlet portion and a cylindrical outlet portion, the inlet end of said inlet portion having an inside diameter similar to the inside diameter of said outlet end of said second pickoff ring, said inlet end of said third vortex tube abutting said outlet end of said second pickoff ring; a third pickoff ring having an inlet end and an outlet end, having an outside diameter less than the inside diameter of said outlet end of said third vortex tube, said inlet end of said third pickoff ring extending into said outlet end of said third vortex tube in coaxial relation thereto to form therebetween a third passage for receiving a residual portion of said liquid vortex, the gas of said gas liquid mixture exiting said unit from said outlet end of said third pickoff ring.

2. The separating unit of claim 1 including a first discharge channel surrounding said first vortex tube and communicating with said first passage for receiving said portion of said liquid vortex.

3. The separating unit of claim 2 including a plurality of substantially longitudinally positioned members in said first discharge channel for arresting the vortex flow of said liquid vortex.

4. The separating unit of claim 2 including a second discharge channel surrounding said second vortex tube and communicating with said second passage.

5. The separating unit of claim 4 including a plurality of vortex arresting members in said second discharge channel.

6. The separating unit of claim 4 including a third discharge channel surrounding said third vortex tube and communicating with said third passage.

7. The separating unit of claim 6 including a plurality of vortex arresting members in said third discharge channel.

8. The separating unit of claim 1 wherein said first, second and third pickoff rings are formed with successively greater inside diameters.

9. The separating unit of claim 1 wherein the area of said first passage between said first vortex tube and said first pickoff ring is greater than the area of said second passage between said second vortex tube and said second pickoff ring.

10. The separating system of claim 9 wherein the area of said second passage between said second vortex tube and said second pickoff ring is greater than the area of said third passage between said third vortex tube and said third pickoff ring.

11. The separating unit of claim 2 including a flow area reducing member in said first discharge channel for reducing the flow area in said first discharge channel to between about 40 and 80 percent of the flow area between said first vortex tube and said first pickoff ring.

12. The separating unit of claim 1 wherein the half-angle of divergence of said divergent portion of said second vortex tube is about 5°.

13. The separating unit of claim 12 wherein the half-angle of divergence of said divergent portion of said third vortex tube is about 4°.

14. The separating unit of claim 1 wherein said first and second pickoff rings are formed integrally with said divergent inlet portions of said second and third vortex tubes, respectively.

15. The separating unit of claim 14 including a first discharge channel surrounding said first vortex tube and communicating with said first passage for receiving said portion of said liquid vortex.

16. The separating unit of claim 15 including a plurality of substantially longitudinally positioned members in said first discharge channel for arresting the vortex flow of said liquid vortex.

17. The separating unit of claim 15 including a second discharge channel surrounding said second vortex tube and communicating with said second passage.

18. The separating unit of claim 17 including a plurality of vortex arresting members in said second discharge channel.

19. The separating unit of claim 17 including a third discharge channel surrounding said third vortex tube and communicating with said third passage.

20. The separating unit of claim 14 including a plurality of vortex arresting members in said third discharge channel.

21. The separating unit of claim 14 wherein said first, second and third pickoff rings are formed with successively greater inside diameters.

22. The separating unit of claim 14 wherein the area of said first passage between said first vortex tube and said first pickoff ring is greater than the area of said second passage between said second vortex tube and said second pickoff ring.

23. The separating system of claim 22 wherein the area of said second passage between said second vortex tube and said second pickoff ring is greater than the area of said third passage between said third vortex tube and said third pickoff ring.

24. The separating unit of claim 14 including a flow area reducing member in said first discharge channel for reducing the flow area in said first discharge channel to between about 40 and 80 percent of the flow area between said first vortex tube and said first pickoff ring.

25. The separating unit of claim 14 wherein the half-angle of divergence of said divergent portion of said second vortex tube is about 5°.

26. The separating unit of claim 25 wherein the half-angle of divergence of said divergent portion of said third vortex tube is about 4°.

27. In a nuclear reactor having a core contained in a pressure vessel for producing a gas-liquid mixture, a system for separating the gas from said mixture comprising: means including a cover forming a gas-liquid chamber above said core; a pool of liquid in said pressure vessel surrounding said core and extending above said cover; a plurality of spaced-apart separator units mounted on said cover in communication with respective openings in said cover to receive said gas-liquid mixture from said chamber, each of said separator units including a first elongated vortex tube having an outlet end and having an inlet end for receiving a gas-liquid mixture; a vortex generator positioned within said inlet end of said first vortex tube for establishing in said first vortex tube a gas vortex surrounded by a liquid vortex; a first pickoff ring having an inlet end and an outlet end, having an outside diameter less than the inside diameter of said outlet end of said first vortex tube, said inlet end of said first pickoff ring extending into said outlet end of said first vortex tube in coaxial relation thereto to form therebetween a first passage for receiving a substantial portion of said liquid vortex; a second elongated vortex tube having a divergent inlet portion and a cylindrical outlet portion, the inlet end of said inlet portion having an inside diameter similar to the inside diameter of said outlet end of said first pickoff ring, said inlet end of said second vortex tube abutting said outlet end of said first pickoff ring; a second pickoff ring having an inlet end and an outlet end, having an outside diameter less than the inside diameter of said outlet end of said second vortex tube, said inlet end of said second pickoff ring extending into said outlet end of said second vortex tube in coaxial relation thereto to form therebetween a second passage for receiving a portion of said liquid vortex; a third elongated vortex tube having a divergent inlet portion and a cylindrical outlet portion, the inlet end of said inlet portion having an inside diameter similar to the inside diameter of said outlet end of said second pickoff ring, said inlet end of said third vortex tube abutting said outlet end of said second pickoff ring; a third pickoff ring having an inlet end and an outlet end, having an outside diameter less than the inside diameter of said outlet end of said third vortex tube, said inlet end of said third pickoff ring extending into said outlet end of said third vortex tube in coaxial relation thereto to form therebetween a third passage for receiving a residual portion of said liquid vortex, the gas of said gas liquid mixture exiting said unit from said outlet of said third pickoff ring.

28. The separator units of claim 27 wherein said first and second pickoff rings are formed integrally with said divergent inlet portions of said second and third vortex tubes, respectively.

* * * * *